June 6, 1950     J. B. BRENNAN     2,510,546
MANUFACTURE OF PRECISION ARTICLES
FROM POWDERED MATERIAL
Filed Dec. 1, 1944
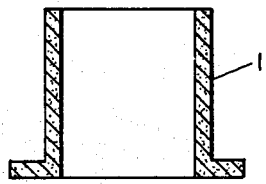
FIG. I
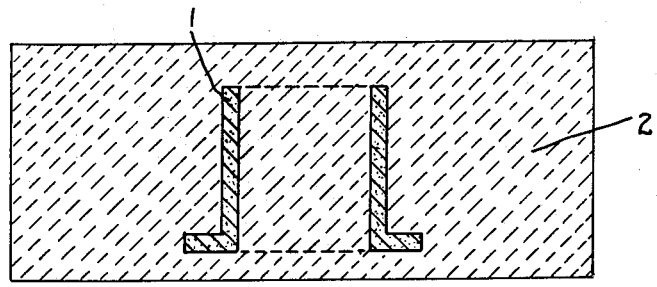
FIG. II
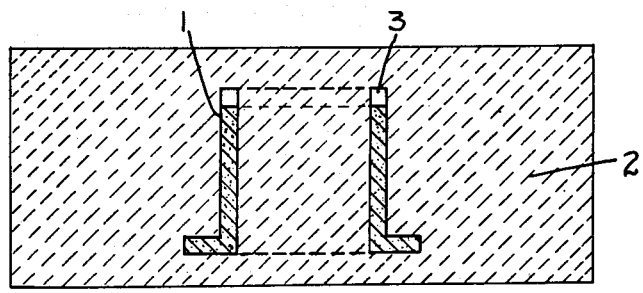
FIG. III
INVENTOR.
JOSEPH B. BRENNAN
BY
Oberlin & Limbach
ATTORNEYS.

Patented June 6, 1950

2,510,546

UNITED STATES PATENT OFFICE 2,510,546

MANUFACTURE OF PRECISION ARTICLES FROM POWDERED MATERIAL

Joseph B. Brennan, Bratenahl Village, Ohio

Application December 1, 1944, Serial No. 566,172

2 Claims. (Cl. 22—200)

My invention relates to the manufacture of powdered metal articles and more specifically to an improved method of making accurate metal mouldings of metals which melt at such high temperatures that they are not now cast accurately. My invention also relates to the use of powdered fusible briquets to form a pattern for an envelope of powdered mold material. By my invention it is possible to increase the strength and density of articles made from powdered metal briquets by increasing the temperature of treatment thereof beyond present sintering temperatures and at the same time prevent unwanted distortion of the briquet so that the finished metal article is substantially as accurate as the briquet from which it is melted within desired tolerances and no more difficult to machine than if the briquet had been merely sintered.

By my invention temperatures may be used in excess of those required to sinter the briquets of powdered metals with improved quality in the metal product resulting.

Referring to the drawings which accompany this application and are a part of the specifications thereof, 1, Fig. I, represent a briquet of powdered metal as commonly used to make a flanged cylindrical sintered sleeve bearing.

Fig. II represents this briquet 1, Fig. I, enclosed in a surrounding briquet 2, Fig. II, of carbon or mica or asbestos or other heat inert material which is compressed around the metal briquet 1, Fig. II, by a briquetting press not shown, at a pressure substantially the same as the pressure used to make the briquet 1, Fig. I. The purpose of the enveloping briquet 2, Fig. II, is to support the powdered metal briquet 1, Fig. II, when melted or fused so that it does not become misshapen. A certain amount of shrinkage will take place in the metal piece 1, Fig. II, after melting and cooling. This shrinkage is indicated by space 3, Fig. II. a cavity developed due to shrinkage of the metal.

A certain amount of gas is enclosed in all briquetted powdered metal forms and the porosity of the surrounding briquet 2, Fig. II, permits this gas to escape on fusing or melting.

The preferred procedure in making metal articles according to my invention is as follows:

First a metal or metal alloy or metal mixture of powder is formed into a briquet 1, Fig. I, in a die under pressure in a hydraulic or other press as is well known.

Second, the briquet 1, Fig. I, is enclosed in powdered carbon or ceramic material in a die cavity and the enclosing powder and article are subjected to pressure in a hydraulic or other press to produce the assembly shown in Fig. II wherein 1 is the metal briquet enclosed by 2, the carbon briquet which is porous enough to permit exit of gas but fine grained enough to prevent passage of liquid metal.

Next the assembly of Fig. II is placed in a furnace and subjected to heat and pressure if desired to fuse and/or melt the briquet 1. In some cases it may be desirable to melt only certain components of briquet 1 and the furnace temperature can be so regulated. If it is desired to use high frequency to fuse or melt the briquet 1 then the enclosing briquet 2 should preferably be of a non-conducting ceramic powder or powdered mica mixture or the enclosing briquet may have an insulating spacer separating it into two parts if conductive.

For example: Metal powder is die-pressed by high pressure into an article of desired shape. Then this preformed blank is transferred to a suitably larger die and completely surrounded by powdered mica mixture with ceramic powder or clay as above-noted and again like high pressure is applied to consolidate the pulverulent mass onto the metal article as a compressed-on enclosing mold therefor. The composite thus formed is then transferred to a furnace muffle chamber and is heated to the temperature of fusion of the metal, the compressed-on mold holding the metal to shape, and after removal from the furnace and cooling, the metal product is freed from the enveloping molded-on material.

After the fusion or melting cycle is complete the assembly of Fig. II can be quenched in water or air cooled and the investment or briquet 2 removed, resulting in the product 1, Fig. III. This resulting product will be denser than the original briquet 1, Fig. I, due among other causes to elimination of gases therefrom. It will take more load as a bearing and will wear longer than a sleeve bearing made of sintered powdered metal with the same analysis.

It is to be seen that many powdered metal articles can be made by my invention of complicated shapes and requiring little or no machining. When powders are chosen to enclose the metal briquet for heat treatment thought must be given to expansion or shrinkage encountered under heat so that allowance is made therefor in the finished article if either is present in the powder.

The enclosing briquet 2, Fig. II, should be compressed so that its strength is sufficient to permit handling and also to withstand the stresses developed by heating the enclosed briquet without cracking. The porosity of the enclosing briquet should be of such a fineness that it will not permit entry in its pores of molten metal from briquet 1 on heating. The porosity should be sufficient however, to vent or absorb gases from briquet 1 on melting.

It is also to be understood as part of my invention that the liquid metal enclosed in the porous compressed envelope of Fig. III may be increased in density and fineness of grain by subjecting to pressure, as described in my copending application Serial No. 552,501, filed September 2, 1944, now Patent No. 2,478,037, granted August 2, 1949 above mentioned.

It is also to be understood according to my description of my invention that liquid metal may be caused to adhere more firmly when in contact with another metallic surface or lamination by the application of pressure if enclosed in a porous envelope which will permit external gas pressure to penetrate to force the liquid metal to penetrate the adjacent metal surface.

Having thus described my invention, what I claim is:

1. A method of forming articles, which comprises compressing powdered metallic material into an article of substantially finished desired shape, surrounding such article with non-reactant pulverulent non-metallic material and compressing the latter onto the article as a self-sustaining envelope, whereby the article does not become misshapen during fusion, and heating the assembly to the fusion point of the powdered metallic material.

2. A method of forming articles, which comprises compressing powdered metallic material into an article of desired shape, compressing non-reactant pulverulent non-metallic material onto such article as a pressed on envelope by pressure substantially as great as that in originally compressing such article, whereby the article does not become misshapen during fusion and heating the whole to the temperature of fusion of the metal.

JOSEPH B. BRENNAN.

REFERENCES CITED

The following references are of record in the file of this patent:

UNITED STATES PATENTS

| Number | Name | Date |
|---|---|---|
| 1,177,407 | Gilson | Mar. 28, 1916 |
| 1,328,336 | Northrup | Jan. 20, 1920 |
| 1,556,658 | Williams | Oct. 13, 1925 |
| 1,950,354 | De Bats | Mar. 6, 1934 |
| 2,027,963 | De Bats | Jan. 14, 1936 |
| 2,352,316 | Goetzel | June 27, 1944 |
| 2,352,842 | Leighton | July 4, 1944 |

FOREIGN PATENTS

| Number | Country | Date |
|---|---|---|
| 375,304 | Great Britain | June 16, 1932 |